United States Patent [19]

Toolan

[11] 4,386,834

[45] Jun. 7, 1983

[54] KIRLIAN PHOTOGRAPHY DEVICE

[75] Inventor: William K. Toolan, Dix Hills, N.Y.

[73] Assignee: Kirlian Equipment Corporation, Jericho, N.Y.

[21] Appl. No.: 280,621

[22] Filed: Jul. 6, 1981

[51] Int. Cl.³ .......................... G03B 41/00; H01T 19/00

[52] U.S. Cl. .......................................... 354/3; 354/62; 250/326; 361/225; 361/232; 361/235

[58] Field of Search ............................ 354/3, 62, 354; 128/653, 665; 250/324–326; 361/229, 225, 232, 235

[56] References Cited

U.S. PATENT DOCUMENTS 3,912,989 10/1975 Watanabe et al. .................. 361/229

4,222,658 9/1980 Mandel ................................ 354/354

OTHER PUBLICATIONS

"Verograph II Deluxe", Mankind Research Unlimited, Inc., Silver Spring, Md.

*Primary Examiner*—William B. Perkey

*Attorney, Agent, or Firm*—Beveridge, De Grandi & Kline

[57] ABSTRACT

A battery-powered corona discharge photography device for holding a photographic recording medium adjacent an electrode, with a specimen in contact with the recording medium. A highly regulated voltage source is coupled by a voltage step-up circuit to a capacitor for storage of an increased level voltage. A silicon controlled rectifier is triggered by a pulse generator to discharge the capacitor, causing a voltage pulse across a transformer primary. Once the pulse generator is activated, it generates a series of pulses of a number determined by the setting of a switch, and so a like series of high voltage electrical pulses is generated across the transformer secondary, and this secondary is connected to the electrode. Either of two transformers can selectively be utilized, to provide selectivity in the frequency characteristics of the high voltage electrical pulses. Means are also provided for reversing the polarity or adjusting the voltage level of the high voltage electrical pulses.

12 Claims, 3 Drawing Figures

KIRLIAN PHOTOGRAPHY DEVICE

BACKGROUND OF THE INVENTION

The present invention pertains to a Corona Discharge Photography device. More particularly, the present invention pertains to an electrical device permitting corona discharge photography with a high degree of repeatability so that consistent, reliable photographs of high quality can be obtained.

Corona discharge photography involves the placing of a photographic film or other recording medium in the vicinity of an electrode and the placing of a subject to be photographed in contact with the film. A pulse of high level voltage is then applied to the electrode, with the result that a corona discharge occurs around the subject, exposing the film. Studies with human subjects have indicated that the resulting photograph varies depending upon several factors, a principle one of which is the condition of the human subject. Thus, various emotional conditions, such as the level of stress or relaxation, and physical conditions, such as tiredness or presence of the preliminary stages of illness, are thought to influence the resulting corona discharge photograph.

Early work with corona discharge photography was done by S. D. Kirlian in the late 1930's. As consequence corona discharge photography is often referred to as Kirlian photography. Much has been written about corona discharge photography or Kirlian photography. Among recent papers on the subject are the following: "Corona Discharge Photography", by David G. Boyers and William A. Tiller, *Journal of Applied Physics,* Vol. 44, No. 7, pages 3102–3112, July 1973; "Biological Applications of Kirlian Photography", by Stanley Krippner, *Journal of the American Society of Psychosomatic Dentistry and Medicine,* Vol. 26, No. 4, pages 122–128, 1979; and "Kirlian Photography, Myth, Fact and Applications", *Electro/78Conference Record,* Institute of Electrical and Electronics Engineers, Inc. 1978. Each of these papers includes an extensive bibliography, U.S. Pat. No. 4,222,658 concerns a Kirlian photography apparatus. The International Kirlian Research Association, a nonprofit organization founded in December 1974, correlates, standardizes, and promotes research into Kirlian photography.

A principle handicap in the further development of Kirlian photography has been the lack of repeatable results. The desirability of reproducible results is discussed in the above-mentioned paper by Boyers and Tiller at page 3102 of the *Journal of Applied Physics.* Experience with existing corona discharge photography equipment has shown that a major source of the inability to obtain consistent, repeatable results has been the equipment itself. Numerous factors, aside from the emotional and physical condition of the subject, affect the results of corona discharge photography. A discussion of these factors is found in the above-mentioned paper by Krippner at page 123 of the *Journal of the American Society of Psychosomatic Dentistry and Medicine.* Among these are atmospheric conditions, particularly relative humidity; variations in the physical relationships of the electrode, the film and the subject; and the characteristics of the voltage pulses applied to the electrode. Factors such as atmospheric conditions can best be controlled by performing the corona discharge photography in a controlled climatic atmosphere, such as in an enclosed, air conditioned room. Likewise, close control of the physical relationships of the electrode, the photographic recording medium, and the subject can minimize the effect of variations in those things. Nevertheless, corona discharge photography continues to suffer from inconsistent results. Experience with existing corona discharge photography equipment has shown that a major cause of the inability to obtain consistent, repeatable results has been the equipment itself.

SUMMARY OF THE INVENTION

The present invention is a corona discharge photography device providing consistent, repeatable, high-quality results. In accordance with the present invention, the corona discharge photography device is energized by a waveform generator which includes a highly regulated voltage source to assure that the high voltage electrical pulses applied to the electrode of the corona discharge photography device are of uniform magnitude, thereby providing consistent, repeatable results. The pulse voltage source utilized in the corona discharge photography device in accordance with the present invention includes a source of electrical control pulses, activating means for activating that electrical control pulse source, a counter for counting electrical control pulses from that source and deactivating the electrical control pulse source in response to counting of a preset number of electrical control pulses, a voltage source, a voltage regulator for regulating the voltage level of voltage from the voltage source, a high-voltage pulse generating means coupled to the voltage regulator and the electrical control pulse source and responsive to each electrical control pulse for generating from the regulated voltage a high-voltage electrical pulse, and means coupling the high-voltage pulse generating means to the electrode of the corona discharge photography device for application of the high-voltage pulses thereto, to cause corona discharge about a specimen contacting a photographic recording medium adjacent the electrode to make a corona discharge photograph of the specimen on the photographic recording medium.

In a preferred embodiment of the present invention, the high-voltage pulse generating means includes voltage step-up means for increasing the voltage level of the regulated voltage, voltage storage means coupled to the step-up means for storing the increased level voltage, and switching means coupled to the voltage storage means and responsive to the electrical control pulses for discharging the voltage storage means to provide in response to a series of the electrical control pulses a like series of pulses of the increased level of voltage. Preferably, the pulses of increased level of voltage are applied to a transformer, the output of which provides high voltage electrical pulses to the electrode of the corona discharge photography device.

BRIEF DESCRIPTION OF THE DRAWINGS

These and other aspects and advantages of the present invention are more apparent in the following detailed description and claims, particularly when considered in conjunction with the accompanying drawings in which like parts bear like reference numerals. In the drawings:

FIG. 2 is a schematic diagram of a preferred embodiment of th corona discharge photography device of FIG. 2 in accordance with the present invention.

DETAILED DESCRIPTION OF THE INVENTION

Figure 1:
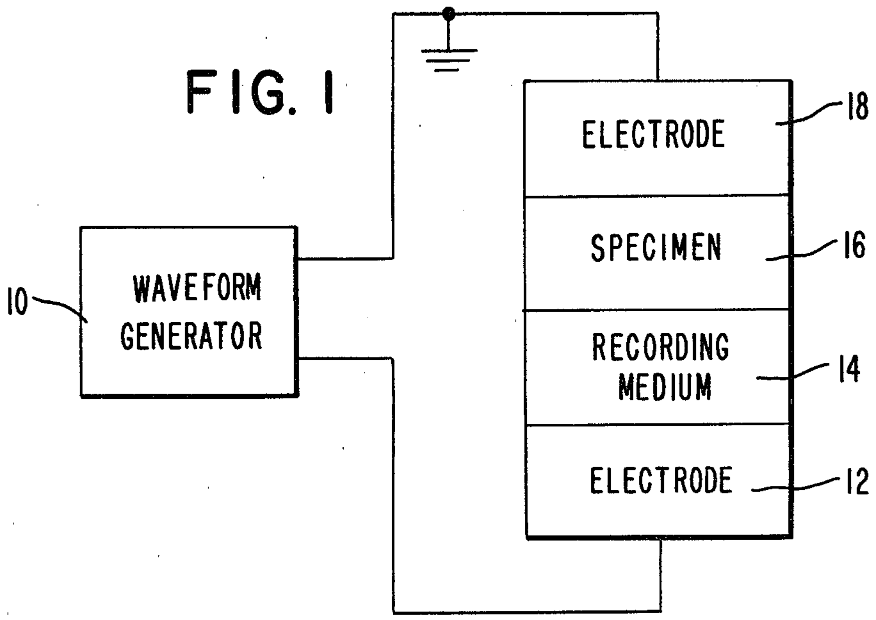
FIG. 1 is a block diagram depicting corona discharge photography utilizing a corona discharge photography device in accordance with the present invention.

FIG. 1 depicts corona discharge photography utilizing a device in accordance with the present invention. Waveform generator 10 is connected to electrode 12 which is adjacent photographic recording medium 14, for example a piece of unexposed photographic film. Specimen 16, of which a corona discharge photograph is desired, contacts the emulsion side of recording medium 14. If desired, the other side of specimen 16 can contact electrode 18 which is connected to the ground of waveform generator 10.

Waveform generator 10 applies a high-voltage pulse, or a series of high-voltage pulses, to electrode 12. Corona discharge occurs around specimen 16, exposing photographic recording medium 14. When recording medium 14 is subsequently developed, a photograph of the corona discharge is obtained.

Figure 2:
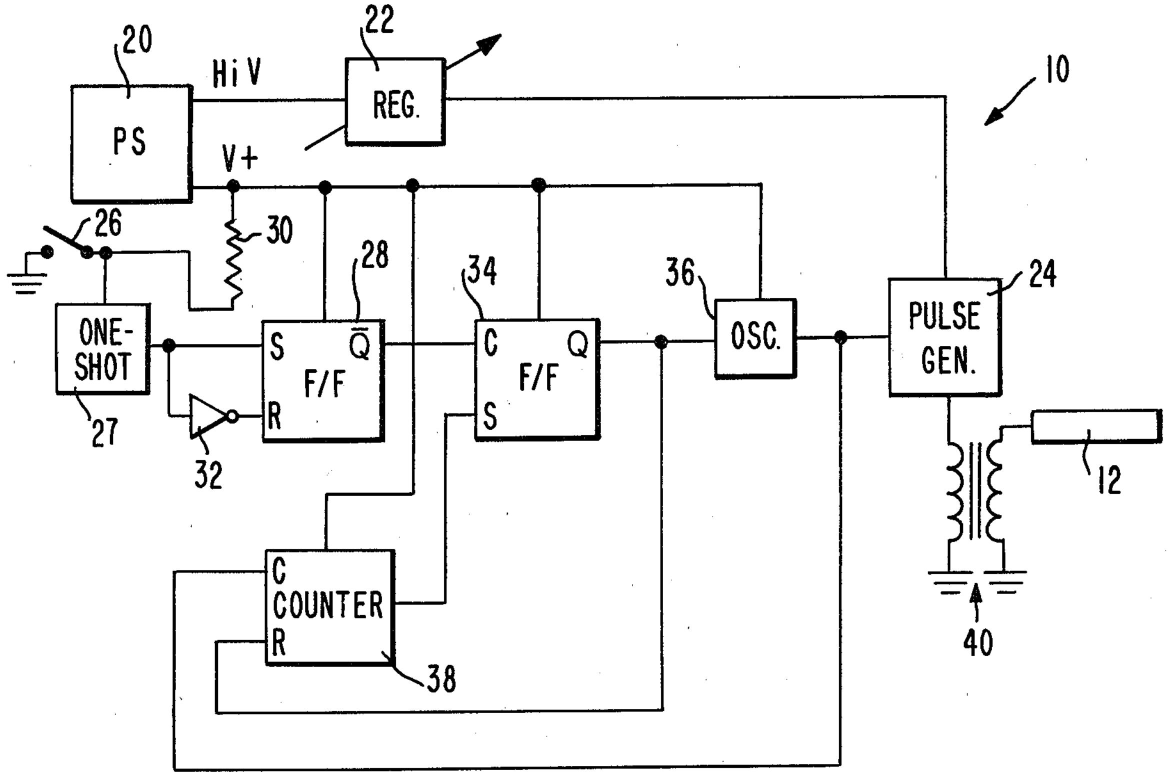
FIG. 2 is a logical block diagram depicting a corona discharge photography device in accordance with the present invention.

FIG. 2 depicts in block diagram form circuitry suitable for use as waveform generator 10. Power supply 20 provides voltage for the various other components of the device and also provides a high voltage to adjustable voltage regulator 22, the output of which is connected to pulse generator 24. Single-pole-single-throw switch 26 has its fixed contact tied to ground and its moveable contact connected to the input of monostable multivibrator or one-shot 27, the output of which is connected to the set input of bistable multivibrator or flip-flop 28 and is coupled through inverter 32 to the reset input of flip-flop 28. The moveable contact of switch 26 is also coupled through resistor 30 to the power supply voltage of source 20.

The $\overline{Q}$ output of flip-flop 28 is connected to the clock input of flip-flop 34, the Q output of which is tied to the control input of oscillator 36. The output of oscillator 36 is connected to the control input of pulse generator 24 and to the count input of counter 38. The reset input of counter 38 is tied to the Q output of flip-flop 34, while the output of counter 38 is connected to the set input of flip-flop 34. The output of pulse generator 24 is tied to one end of the primary winding of transformer 40, the second end of which is tied to ground. One end of the secondary winding of transformer 40 is tied to electrode 13 of the corona discharge photography device, while the second end is tied to ground.

In the quiescent condition, switch 26 is open and flip-flops 28 and 34 are set, and so oscillator 36 is inactive. As a result, there is no output from pulse generator 24, and no voltage is applied to electrode 12. Counter 38 is preset to count the number of pulses from oscillator 36 corresponding with the number of pulses it is desired to apply to electrode 12.

To activate the circuit, switch 26 is closed and then released. When switch 26 is released, one-shot 27 is triggered to its unstable state, resetting flip-flop 28. The Q output from flip-flop 28 resets flip-flop 34, and the Q output from that flip-flop resets counter 38 and activates oscillator 36. Each output pulse from oscillator 36 triggers pulse generator 24 to provide a pulse across the primary of transformer 40. The resulting high voltage electrical pulse generated on the secondary of transformer 40 is applied to electrode 12 to cause corona discharge around specimen 16. When one-shot 27 returns to its stable state, flip-flop 28 is set.

The pulses from oscillator 36 are also counted by counter 38. After counting the number of pulses to which counter 38 has been preset, the counter applies a signal to the set input of flip-flop 34, returning the flip-flop to its quiescent state, deactivating oscillator 36 and terminating the pulses on transformer 40.

Voltage regulator 22 provides a uniform, high level of voltage, and pulse generator 24 and transformer 40 are selected to avoid degradation of that uniformity. Consequently, pulses of substantially uniform level are applied to electrode 12. This results in consistent, repeatable corona discharge photography so long as other factors such as climatic conditions and physical relationships of the various components are uniform.

Figure 3:
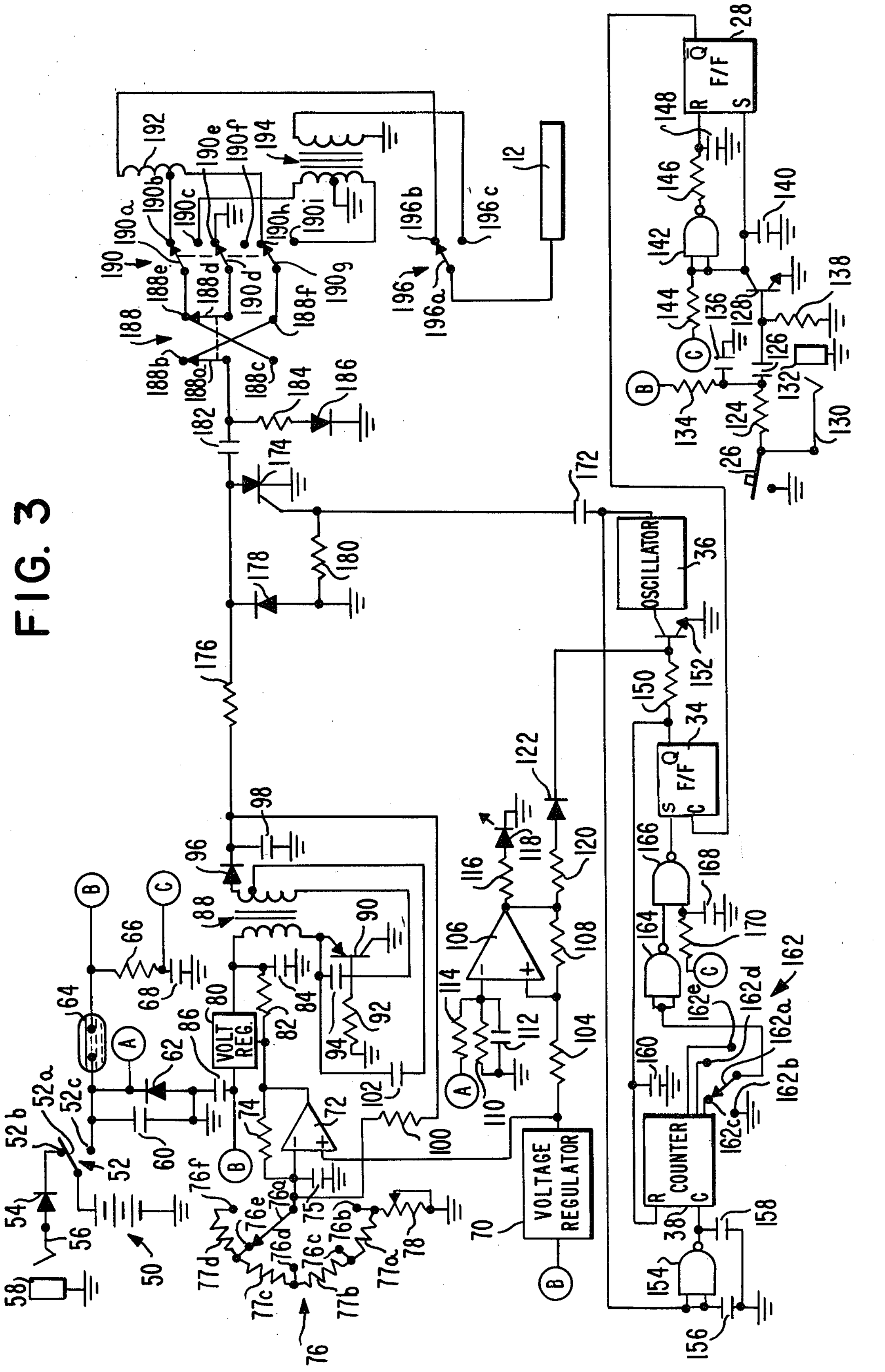

FIG. 3 depicts in schematic block diagram form circuitry suitable for implementation of the corona discharge photography device of FIG. 2. Battery 50 has its negative terminal tied to ground and its positive terminal tied to the moving contact **52*a* of single-pole-double-throw switch 52. The first fixed contact 52*b* of switch 52 is connected to the cathode of diode 54. The anode of diode 54 is tied to phone plug 56, jack 58 of which permits connection of an external voltage source for recharging of battery 50. The second fixed contact 52*c* of switch 52 is coupled to ground through capacitor 60 and is tied to the cathode of diode 62, the anode of which is tied to ground. The second fixed contact 52*c* of switch 52 is also connected to voltage point A which connects to all similarly labelled points in FIG. 3. Further, the second fixed contact 52*c* of switch 52 is connected to one terminal of tilt switch 64, the second terminal of which is coupled through the series combination of resistor 66 and capacitor 68 to ground. The second contact of tilt switch 64 is also connected to voltage point B which connects to all similarly labelled points in FIG. 3. The junction of resistor 66 and capacitor 68 is tied to voltage point C which, likewise, connects to all similarly labelled points in FIG. 3. Tilt switch 64 can be, for example, a mercury switch which provides electrical continuity between its two terminals so long as it is maintained level. Should it be tilted, the mercury or other electrically conductive liquid flows away from one of its terminals, interrupting electrical continuity. Thus, tilt switch 64 assures that the corona discharge photography device is operative only when maintained in a reasonably level position. When the moveable contact 52*a* of switch 52 is closed to its second fixed contact 52*c*, voltage from battery 50 is available at voltage point A and, so long as tilt switch 64** maintains electrical continuity between its two terminals, also at voltage points B and C.

Voltage point B is tied to the input of voltage regulator 70, the output of which is connected to the summing point of operational amplifier 72. The output of amplifier 72 is coupled through resistor 74 to the difference input of that amplifier. The difference input of operational amplifier 72 is also connected to the moveable contact **76*a* of single-pole-multiple-throw switch 76. The first fixed contact 76*b* of switch 76 is coupled by rheostat 78 to ground. The second fixed contact 76*c* of switch 76 is coupled to contact 76*b* by a resistor 77*a*. Each of the remaining fixed contacts 76*d*–76*f* of switch 76 is coupled to its preceding fixed contact 76*c*–76*e* by a resistor 77*b*–77*d*. Thus, the position of switch 76** determines the amount of electrical resistance between the difference input of operational amplifier 72 and ground and thus determines the voltage level of the output of the operational amplifier.

The output of operational amplifier 72 is tied to the control input of adjustable voltage regulator 80. Voltage point B is connected to the voltage input of regulator 80 which is also coupled through capacitor 86 to ground. The output of voltage regulator 80 is coupled to the control input of the regulator by resistor 82 and is coupled to ground by capacitor 84. Thus, the position of switch 76 determines the setting of adjustable voltage regulator 80.

The output of voltage regulator 80 is connected to one side of the primary of transformer 88, the second side of which is tied to the emitter of PNP transistor 90. The collector of transistor 90 is tied to ground, while the base of the transistor is coupled through resistor 92 to ground and through capacitor 94 to the emitter of the transistor. One end of the secondary of transformer 88 is tied to the anode of diode 96, the cathode of which is coupled through capacitor 98 to ground and through resistor 100 to the difference input of operational amplifier 72. The second end of the secondary of transformer 88 is tied to the base of transistor 90. A center tap on the secondary of transformer 88 is coupled through capacitor 102 to the emitter of transistor 90.

Transformer 88, transistor 90, and the related resistors and capacitors form a DC-to-DC voltage converter. Transformer 88 and transistor 90 make up an oscillator, so that pulses of the output voltage from voltage regulator 80 pass through the primary of transformer 88. Transformer 88 steps up this voltage so that pulses of increased level voltage are applied to diode 96. By way of example, this increased level voltage might be of a value up to about 350 volts, depending upon the position of switch 76.

The output of voltage regulator 70 is coupled through resistor 104 to the summing input of operational amplifier 106, the output of which is coupled through resistor 108 to that same summing input. The difference input of amplifier 106 is coupled to ground by the parallel combination of resistor 110 and capacitor 112 and is coupled by resistor 114 to voltage point A. The output of operational amplifier 106 is coupled by resistor 116 to the anode of light-emitting diode (LED) 118, the cathode of which is tied to ground. The output of operational amplifier 106 is also coupled by resistor 120 to the anode of diode 122.

Operational amplifier 106 compares the voltage of battery 50, as available at voltage point A, with the output of voltage regulator 70. Should the battery voltage be below a level determined by voltage regulator 70, operational amplifier 106 provides an output voltage which activates LED 118 and which makes voltage available at the cathode of diode 122.

The fixed contact of single-pole-single-throw switch 26 is tied to ground, while the moving contact of the switch is coupled through resistor 124 and capacitor 126 to the base of NPN transistor 128. The moving contact of switch 26 is also connected to phone plug 130, jack 132 of which permits connection to a remote switch operable as an alternative to switch 26. The junction of resistor 124 and capacitor 126 is coupled by resistor 134 to voltage point B and is coupled to ground through capacitor 136. The base of transistor 126 is coupled to ground by resistor 138.

The emitter of transistor 128 is tied to ground, while the collector of the transistor is coupled to ground by capacitor 140 and is tied to the set input of flip-flop 28. NOR gate 142 has both of its inputs coupled by resistor 144 to voltage point C and also tied to the collector of transistor 128. The output of NOR gate 142 is coupled by resistor 146 to the reset input of flip-flop 28, and that reset input is also coupled to ground by capacitor 148. The $\overline{Q}$ output of flip-flop 28 is tied to the clock input of flip-flop 34. Transistor 128, capacitors 126, 136, and 140 and resistors 124, 134, 138, and 144 thus serve as one-shot 27 of FIG. 2, while NOR gate 142, resistor 146 and capacitor 148 serve as inverter 32.

The Q output of flip-flop 34 is coupled by resistor 150 to the base of NPN transistor 152 which is also tied to the cathode of diode 122. The emitter of transistor 152 is tied to ground, while the collector is connected to the gate input of oscillator 36. The output of oscillator 36 is tied to both inputs of NOR gate 154 which thus functions as in inverter. The inputs of gate 154 are also coupled to ground by capacitor 156, while the output of gate 154 is coupled to ground by capacitor 158 and is tied to the count input of counter 38. The reset input of counter 38 is connected to the Q output of flip-flop 34 and is coupled to ground by capacitor 160.

Single-pole-multiple-throw switch 162 has its first fixed contact 162*b* tied to ground and each of its other fixed contacts 162*c–e* connected to an associated one of the outputs from counter 38. Moveable contact 162*a* of switch 162 is connected to both inputs of NOR gate 164 which acts as an inverter and which has its output tied to one input of NOR gate 166. The second input of gate 166 is coupled to ground by capacitor 168 and is coupled to voltage point C by resistor 170. The output of gate 166 is connected to the set input of flip-flop 34. Thus, the position of switch 162 determines the number of pulses from oscillator 36 which counter 38 must count before flip-flop 34 is set. If switch 162 has its moveable contact 162*a* closed to the grounded fixed contact 162*b*, then no count signal from counter 38 is utilized to shut off oscillator 36.

In quiescent condition of this circuitry, with switch 26 open, transistor 128 is turned off, flip-flops 28 and 34 are set, and transistor 152 is turned on, grounding the control input of oscillator 36 and so inactivating the oscillator. To activate the system, switch 26 is closed and then released. Alternatively, phone plug 130 and jack 132 can be utilized for remote activation of the system. When switch 26 is closed, or when phone plug 130 is connected to ground, the junction of resistor 124 and capacitor 126 is pulled to a lower voltage than in the quiescent condition. When switch 26 is released or the remote switch connected via phone plug 130 and jack 132 is opened, the junction of resistor 124 and capacitor 126 returns to a high voltage, and this pulse is coupled by capacitor 126 to the base of transistor 128, turning on the transistor and resetting flip-flop 28. The $\overline{Q}$ output from flip-flop 28 clocks flip-flop 34 to its reset condition, and as a consequence, counter 38 is reset and transistor 152 is cut off, removing the ground from the control input of oscillator 36 and so activating the oscillator. Once the voltage on the base of transistor 128 has drained to ground through resistor 138, transistor 128 cuts off, returning flip-flop 28 to its set condition.

When counter 38 has counted a number of pulses from oscillator 36 determined by the setting of switch 162, a pulse from the counter is applied through gates 164 and 166 to set flip-flop 34, turning on transistor 152 and inactivating oscillator 36. If switch 162 has its moveable contact 162*a* closed to its grounded fixed contact 162*b*, once switch 26 is operated to initiate operation of oscillator 36, the oscillator runs continuously until switch 26 is operated a second time. The second closing and reopening of switch 26 resets and sets flip-flop 28, and the $\overline{Q}$ output from flip-flop 28 clocks flip-flop 34 to set it, thereby turning on transistor 152 and deactivating oscillator 36.

If the voltage from battery 50 is low, operational amplifier 106 provides an output which activates LED 118 and holds transistor 152 on. As a consequence, oscillator 36 is held in its inactive condition, and no pulses are generated, keeping the entire circuit inactive.

The output from oscillator 36 is coupled by capacitor 172 to the gate of silicon controlled rectifier (SCR) 174, the cathode of which is tied to ground. The anode of SCR 174 is coupled by resistor 176 to the junction of diode 96 and capacitor 98. The junction of the anode of SCR 174 and resistor 176 is tied to the cathode of diode 178, the anode of which is connected to ground. The gate of SCR 174 is coupled to ground by resistor 180.

The anode of SCR 174 is coupled by capacitor 182 to one side of resistor 184. The second side of resistor 184 is connected to the anode of diode 186, the cathode of which is tied to ground. The junction of capacitor 182 and resistor 184 is connected to first moving contact 188*a* of double-pole-double-throw switch 188. The fixed contacts 188*b* and 188*c* associated with the moving contact 188*a* are connected respectively with fixed contacts 188*f* and 188*e* of the second moving contact 188*d* so that switch 188 operates as a reversing switch.

First moving contact 190*a* of three pole-double-throw switch 190 is tied to fixed contact 188*e* of switch 188. Moving contact 190*a* has its first fixed contact 190*b* tied to the center tap of autotransformer 192 and its second fixed contact 190*c* connected to one end of the primary of transformer 194. The primary of transformer 194 has a grounded center tap. Moving contact 190*d* of switch 190 is tied to moving contact 188*d* of switch 188 and has its first fixed contact 190*e* tied to ground and its second fixed contact 190*f* left open with no connection. The third moving contact 190*g* of switch 190 is tied to fixed contact 188*f* of switch 188, while its first fixed contact 190*h* is connected to the primary end of autotransformer 192 and its second fixed contact 190*i* is tied to the second end of the primary of transformer 194.

The moving contact of high voltage switch 196 is connected to electrode 12, while its fixed contact 196*b* is connected to the secondary end of autotransformer 192 and its second fixed contact 196*c* is connected to one end of the secondary of transformer 192, the second end of which is tied to ground.

In the quiescent condition of the circuit of FIG. 3, with switch 26 open and moveable contact 52*a* of switch 52 closed against fixed contact 52*c*, voltage is available at points A, B, and C, transistor 128 is cut off, transistor 152 is on, and flip-flops 28 and 34 are set. As a consequence, oscillator 36 is inactive and SCR 174 is cut off. The increased level voltage from diode 96 has charged capacitor 182. Assume switch contact 76*a* is closed against contact 76*e*, switch contact 162*a* is closed against switch contact 162*c*, switch contacts 188*a* and 188*d* are closed respectively against switch contacts 188*b*, 188*e*, switch contacts 190*a*, 190*d*, and 190*g* are closed respectively against switch contacts 190*b*, 190*e* and 190*h* and switch contact 196*a* is closed against switch contact 196*b*, all as depicted in FIG. 3. When switch 26 is then closed and then reopened, flip-flop 34 is reset, cutting off transistor 152 to activate oscillator 36. The Q output from flip-flop 34 resets counter 38 which then counts the pulses from oscillator 36.

Each pulse from oscillator 36 turns on SCR 174 to discharge capacitor 182. When the voltage from capacitor 182 has drained to ground through SCR 174, the SCR again shuts off. Before the next pulse from oscillator 36, capacitor 182 recharges. As a consequence, as oscillator 36 generates a series of pulses, a like series of pulses of the increased level voltage occurs across capacitor 182.

With the switches in the positions depicted in FIG. 3, these increased level voltage pulses across capacitor 182 are applied across the primary of autotransformer 192. As a consequence, high-voltage pulses are generated across the secondary of autotransformer 192, and these high-voltage pulses are applied to electrode 12.

When counter 38 has counted the number of pulses from oscillator 36 for which switch 162 is set, a pulse passes through gates 164 and 166 to set flip-flop 34, turning on transistor 152 and so deactivating oscillator 36. Since SCR 174 is no longer gated on to discharge capacitor 182, the application of pulses to electrode 12 ends.

The magnitude of the pulses on electrode 12 can be controlled by the setting of single-pole-multiple-throw switch 76, while the polarity of the pulses can be reversed with switch 188. The number of pulses applied before the oscillator is inactivated can be preset by means of switch 162.

If three-pole-double-throw switch 190 is moved to its second position, with moveable contacts 190*a*, 190*d*, and 190*g* closed against fixed contacts 190*c*, 190*f*, and 190*i*, then the voltage pulses generated across capacitor 182 are applied across one-half of the primary of transformer 194. The half of the primary of transformer 194 across which the pulses are applied is determined by the setting of reversing switch 188 which thus determines the polarity of the pulses generated across the secondary of transformer 194. If switch 196 is also moved to its second position, with moveable contact 196*a* closed against fixed contact 196*c*, these pulses across the secondary of transformer 194 are applied to electrode 12. While switch 196 needs to be capable of handling the high voltages applied through it to electrode 12, it could be mechanized to operate with switch 190 as a four-pole-double-throw switch.

Transformer 192 is selected to give pulses having lower frequency components, while transformer 194 is selected to give pulses with higher frequency components. Transformer 192 can be any suitable transformer, for example, the ignition coil from an automobile. Similarly transformer 194 can be any suitable transformer, for example, the flyback transformer from a television receiver.

The circuit of FIG. 3 can be utilized to provide high-voltage pulses to electrode 12, for example, pulses in the range of 15,000 to 20,000 volts. The circuit provides pulses of uniform, repeatable voltage level, giving uniform, reproducible results with the corona discharge photography device.

Although the present invention has been described with reference to a preferred embodiment, numerous alterations, rearrangements, and substitutions can be made, and still the result would be within the scope of the invention.

What is claimed is:

1. A corona discharge photography device comprising electrode means; means for holding a photographic recording medium adjacent said electrode means to contact a specimen to be subjected to corona discharge photography; a source of electrical control pulses; activating means for activatin g said electrical control pulse source; a counter for counting electrical control pulses from said electrical control pulse source and deactivating said electrical control pulse source in response to counting of a preset number of electrical control pulses; a voltage source; voltage regulator means for regulating the voltage level of the voltage from said voltage source; high voltage generating means coupled to said voltage regulator means and said electrical control pulse source and responsive to each electrical control pulse for generating from the regulated voltage a high voltage electrical pulse; and means coupling said high voltage pulse generating means to said electrode means for application of the high voltage pulses thereto to cause corona discharge about a specimen contacting a photographic recording medium adjacent said electrode means to make a corona discharge photograph of the specimen on the photographic recording medium.

2. A device as claimed in claim 1 in which said high voltage pulse generating means comprises voltage step-up means for increasing the voltage level of the regulated voltage; voltage storage means coupled to said voltage step-up means for rotating the increased level voltage therefrom; and switching means coupled to said voltage storage means and responsive to the electrical control pulses for discharging said voltage storage means to provide in response to a series of the electrical control pulses a like series of pulses of the increased level voltage.

3. A device as claimed in claim 2 in which said voltage step-up means comprises a transformer and a switching device coupled to said voltage regulator means as an oscillator for generating across the transformer secondary pulses of increased level voltage, and means for applying the increased level voltage pulses to said voltage storage means.

4. A device as claimed in claim 2 in which said switching means comprises a silicon controlled rectifier having its anode-cathode circuit connected to said voltage storage means and its gate coupled to said electrical control pulse source.

5. A device as claimed in claim 2 in which said high voltage pulse generating means further comprises transformer means responsive to the pulses of increased level voltage for generating high voltage electrical pulses.

6. A device as claimed in claim 5 in which said transformer means comprises a first transformer responsive to receipt of voltage pulses at the primary thereof for providing at the secondary thereof voltage pulses having a first frequency characteristic, a second transformer responsive to receipt of voltage pulses at the primary thereof for providing at the secondary thereof voltage pulses having a second frequency characteristic of a higher frequency than the first frequency characteristic, and switching means actuable to selectively couple one of said first transformer and said second transformer between said voltage storage means and said coupling means.

7. A device as claimed in any one of claims 1–6 in which said high voltage pulse generating means includes means for selectively determining the polarity of the high voltage electrical pulses.

8. A device as claimed in any one of claims 1–6 in which said counter includes means for selectively presetting the number of electrical control pulses which said counting means counts before deactivating said electrical control pulse source.

9. A device as claimed in claim 1 in which said electrical control pulse source is a gated free-running oscillator.

10. A device as claimed in claim 1 in which said voltage source is adjustable to permit adjustment of the voltage level of the high voltage electrical pulses.

11. A device as claimed in claim 1 in which said voltage source includes a battery and circuit means adapted for connection to an external voltage source for recharging of said battery.

12. A device as claimed in claim 11 further comprising circuit means for indicating when the voltage level of said battery is low, requiring recharging of said battery.

* * * * *